United States Patent [19]
Yin et al.

[11] Patent Number: 5,499,117
[45] Date of Patent: Mar. 12, 1996

[54] TRANSFER OF PHOTOPOLYMER HOLOGRAM FROM A CURVE SURFACE TO ANOTHER CURVE SURFACE

[75] Inventors: Khin S. Yin, Alhambra; Kevin H. Yu, Temple City, both of Calif.

[73] Assignee: Hughes Aircraft Company, Los Angeles, Calif.

[21] Appl. No.: 298,626

[22] Filed: Aug. 31, 1994

[51] Int. Cl.$^6$ .............................. G03H 1/04; G03H 1/02
[52] U.S. Cl. .......................... 359/3; 359/8; 430/1; 430/2
[58] Field of Search .................................. 359/2, 3, 8, 13, 359/14; 430/1, 2

[56] References Cited

U.S. PATENT DOCUMENTS

| | | | |
|---|---|---|---|
| 4,530,564 | 7/1985 | Close | 359/3 |
| 4,789,211 | 12/1988 | Wreede | 359/3 |
| 4,913,504 | 4/1990 | Gallagher | 359/2 |
| 4,923,848 | 5/1990 | Akada et al. | 156/235 |
| 4,950,567 | 8/1990 | Keys et al. | 359/13 |
| 4,959,284 | 9/1990 | Smothers et al. | 359/3 |
| 4,990,415 | 2/1991 | Yu | 430/2 |
| 5,138,469 | 8/1992 | Wood et al. | 359/3 |
| 5,198,914 | 3/1993 | Arns | 359/8 |
| 5,282,066 | 1/1994 | Yu et al. | 359/3 |

*Primary Examiner*—Martin Lerner
*Attorney, Agent, or Firm*—Leonard A. Alkov; W. K. Denson-Low

[57] ABSTRACT

A method for transferring a photopolymer hologram from a curved exposure surface to a curved application surface including the steps of forming a release layer on the exposure surface, forming a photopolymer layer on the release layer, forming a protective layer on the photopolymer layer, recording a hologram in the photopolymer layer, removing the protective layer, attaching the laminar assembly comprised of the exposure substrate, the release layer and the photopolymer layer to the curved application surface of the final substrate with an optical adhesive layer located between the photopolymer layer and the curved application surface, and removing the exposure substrate from the release layer.

8 Claims, 3 Drawing Sheets

5,499,117

TRANSFER OF PHOTOPOLYMER HOLOGRAM FROM A CURVE SURFACE TO ANOTHER CURVE SURFACE

BACKGROUND OF THE INVENTION

The subject invention is generally directed to a technique for transferring a hologram assembly from one surface to another surface, and more particularly to a technique for transferring a hologram assembly from one non-planar surface to another non-planar surface.

Hologram assemblies comprised of single or multiple hologram layers are being utilized in a variety of holographic products including, for example, automotive head up displays (HUDs) and eye protection goggles. A consideration with holograms is the difficulty of avoiding distortion to the optical properties of a hologram when transferring a hologram from a surface of a substrate utilized for exposure to a surface of a final substrate, particularly where the surface of the final substrate is curved, including for example spherical surfaces, aspherical surfaces, cylindrical surfaces and complex surfaces having continuous bends. Of course, in some applications it may be possible to directly expose the hologram recording layers of a hologram assembly while such layers are attached to the final substrate, but it would be inconvenient or difficult to do this with many final substrates as a result of factors such as size or lack of rigidity of the final substrate. Moreover, commercially available hologram recording films are typically not readily amenable to application to curved substrates for purposes of exposure, except in the case of cylindrical substrates of relative large diameter.

SUMMARY OF THE INVENTION

It would therefore be an advantage to provide a technique for transferring a hologram layer from one curved surface to another curved surface without distorting the optical properties of the hologram layer.

The foregoing and other advantages are provided by the invention in a method that includes the steps of forming a release layer on a curved exposure surface, forming a photopolymer layer on the release layer, forming a protective layer on the photopolymer layer, recording a hologram in the photopolymer layer, removing the protective layer, attaching the photopolymer layer to a curved surface of a final substrate with optical adhesive such that the laminar assembly comprised of the exposure substrate, the release layer and the photopolymer layer is attached to the final substrate, and removing the exposure substrate and the release layer.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
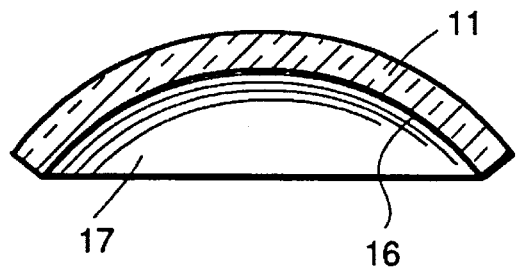
FIGS. 1, 2, 3, 4, 5 and 6 schematically illustrate a process in accordance with the invention for transferring a photopolymer hologram from a convex curved exposure surface to a concave curved surface of a final substrate.

In the following detailed description and in the several figures of the drawing, like elements are identified with like reference numerals.

FIGS. 1–6 schematically exemplify a process in accordance with the invention for transferring a photopolymer hologram from a curved exposure surface to a curved application surface, for the particular example of a concave application surface and a convex exposure surface that is matched to the concave application surface as described further herein. Referring in particular to FIG. 1, a transparent polyvinyl (PVA) layer 11 is formed on a convex exposure surface 16 of a transparent glass exposure substrate 17, shown by way of illustrative example as a plano convex lens, which allows the substrate to be part of the optics for forming a hologram in a photopolymer layer that is to be subsequently formed on the PVA layer, as described further herein. For hologram exposure purposes, the exposure substrate 17 conventionally includes an anti-reflection coating (not shown) on the substrate surface that is opposite the convex exposure surface 16. The PVA layer 11 has sufficiently low adhesion to both the glass exposure surface 16 and a photopolymer layer to be formed thereon as described further herein, such that the PVA layer 11 functions as a release layer, but has sufficient adhesion that delamination does not occur in the step of baking that is performed in recording a hologram in the photopolymer layer. The PVA layer 11 is formed by application of a PVA solution to the exposure surface 16, for example by spin coating, spray coating, or dip coating, depending upon the configuration of the substrate 17. The PVA coating is then dried, for example on a laminar flow bench at room temperature. By way of illustrative example, a PVA solution comprised of ADCHEM PVA polyvinyl alcohol diluted with deionized water to a viscosity of 110 centipoise is spin coated onto the convex exposure surface 16 at a spin rate of 500 RPM for three minutes, which results in a dried PVA layer 11 having a thickness of approximately 5–7 microns.

Figure 2:
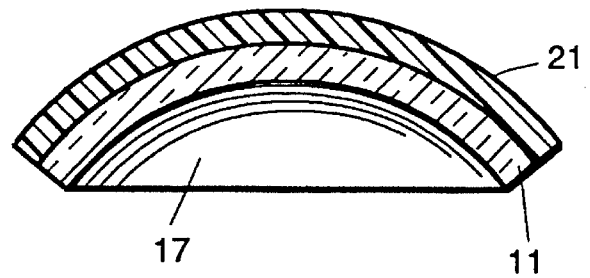

Referring now to FIG. 2, a photopolymer solution is applied to the PVA layer 11 to form a photopolymer layer 21 on the PVA layer. The photopolymer layer can be applied by spin coating, spray coating, or dip coating, for example, depending on the particular configuration of the substrate 17. The photopolymer layer is then dried, for example on a laminar flow bench at room temperature. The photopolymer layer 11 is configured to record holographic fringes, and thus the desired thickness thereof, after drying, will depend upon the particular hologram fringes to be recorded therein. By way of illustrative example, a DuPont HRS 700 solution of 13.8% solids and having a viscosity of 115 centipoise is spin coated onto the PVA layer 11 at 150 RPM for three minutes, and then dried on a laminar flow bench to produce a photopolymer layer having a thickness of approximately 5–10 microns.

Figure 3:
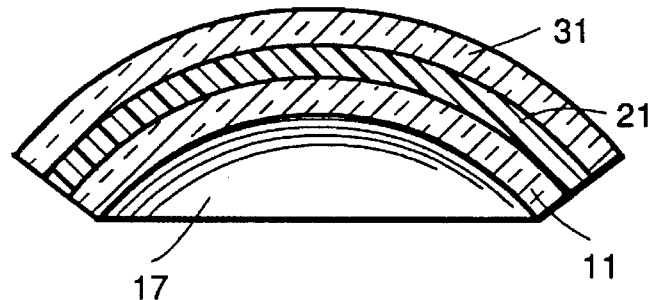

Referring now to FIG. 3, a PVA solution is applied to the photopolymer layer 21 to form a substantially transparent protective PVA layer 31 on the photopolymer layer. The PVA layer 31 protects the photopolymer layer 21 from any index matching fluid in the holographic exposure system utilized in recording a hologram in the photopolymer layer 21, and can be formed using substantially the same materials and parameters utilized to form the PVA layer 11. After the PVA layer 31 is dried, a hologram is recorded in the photopolymer layer 21, for example in accordance with conventional hologram recording techniques. Such techniques would typically include the steps of exposure to hologram forming illumination, exposure to UV light, and baking. It should be noted that since the PVA layer 11 comprises a release layer, the step of baking should be performed carefully to avoid loosening or delamination of the PVA layer 11 from the exposure substrate and to avoid delamination of the photopolymer layer from the photopolymer layer 21. For example, baking at 120° C. for 2 hours does not cause loosening of the release layer or the photopolymer layer.

Figure 4:
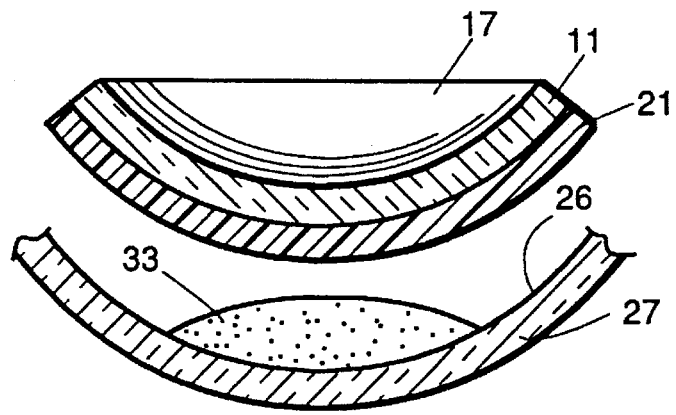
Figure 5:
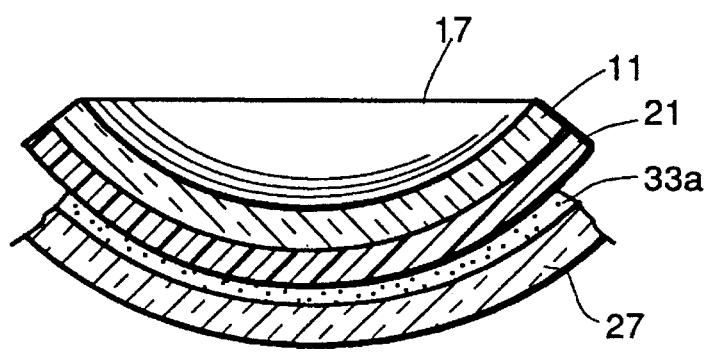

Referring now to FIG. 4, after a hologram is recorded in the photopolymer layer 21, any index matching fluid remaining on the PVA layer 31 is removed, and the PVA layer 31 is peeled from the photopolymer layer 21. The photopolymer layer 21 is then attached with a transparent optical adhesive to an application surface 26 of a final substrate 27, where the application surface 26 is a concave surface as to which the convex shape of the exposure surface 16 has been matched such that the exposure surface 16 and the application surface can be spaced apart by a predetermined spacing that provides for a substantially constant surface to surface distance between the exposure surface and the application surface which accommodates the thickness of the PVA layer 11, the thickness of the photopolymer layer 21, and a layer of optical adhesive layer having a thickness that is appropriate for the particular optical adhesive and which can be uniform. The optical adhesive utilized should be one that is compatible with the photopolymer layer 21, and the final substrate 27, shown by way of illustrative example as a curved substrate of uniform thickness, is comprised of a material that is not attacked by the particular optical adhesive to be utilized. By way of illustrative example, Norland NOA 68 optical can be utilized with a final substrate comprised of glass or CR-39 plastic. Alternatively, the final substrate comprises a material such as polycarbonate with a protective hardcoat coating of either an acrylic or siloxane coating forming the application surface 26. More particularly in regard to attaching the photopolymer layer 21 to the application surface 26, the final substrate 27 is oriented with the concave application surface 26 facing upward, and an optical adhesive is poured into the application surface to form an adhesive puddle 33. Appropriate spacers (not shown) are installed in a conventional manner for setting the final spacing between exposure surface and the application surface to the predetermined spacing, and the assembly comprised of the exposure substrate 17, the PVA release layer 11 and the photopolymer layer 21 is then pressed toward the application surface 26, with the photopolymer layer 21 closest to the application surface 26, until the exposure surface and the application surface are at the predetermined spacing. As the photopolymer layer 21 is pressed toward to the application surface, the optical adhesive will spread between the photopolymer layer 21 and the application surface 26 to form an optical adhesive layer 33a between the photopolymer layer 21 and the application surface, as schematically depicted in FIG. 5. The optical adhesive layer 33a is cured as appropriate for the particular adhesive utilized. For the previously mentioned Norland NOA 68 optical adhesive, curing is achieved by exposure to UV light, and mild baking if desired.

Figure 6:
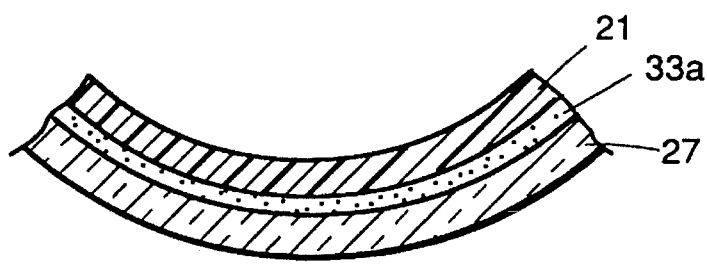

After the optical adhesive layer 33a is cured, the exposure substrate 17 and the PVA release layer 11 are removed to produce the final hologram assembly comprised of the photopolymer layer 21, the optical adhesive layer 33a, and the final substrate 27, as shown in FIG. 6. For example, the exposure substrate 17 can be gently removed from the PVA layer 11, and the PVA layer 11 can then be removed from the photopolymer layer 21 by peeling, to the extent that the PVA layer 11 remains attached to the photopolymer layer 21. Alternatively, the assembly comprised of the exposure substrate and the PVA layer is gently removed from the photopolymer layer 21, to the extent that the PVA layer remains attached to the exposure surface when the exposure substrate is removed from the assembly shown in FIG. 5. If the PVA layer does not peel as a unitary layer from the photopolymer layer, the PVA fragments on the photopolymer layer can be dissolved with water for removal.

Further in accordance with the invention, in the foregoing implementation the protective layer 31 can be retained so as to protect the photopolymer layer from the optical adhesive layer 33a, in which case the protective PVA layer 31 will be different from the PVA layer 11 and preferably has greater adhesion than the PVA layer 11. Also, the convex exposure surface would be matched to the concave application surface such that the exposure surface and the application surface can be spaced apart by a predetermined spacing that provides for a substantially constant surface to surface distance between the exposure surface and the application surface which accommodates the thickness of the PVA layer 11, the thickness of the photopolymer layer 21, the thickness of the PVA layer 31, and a layer of optical adhesive layer having a thickness that is appropriate for the particular optical adhesive.

Figure 7:
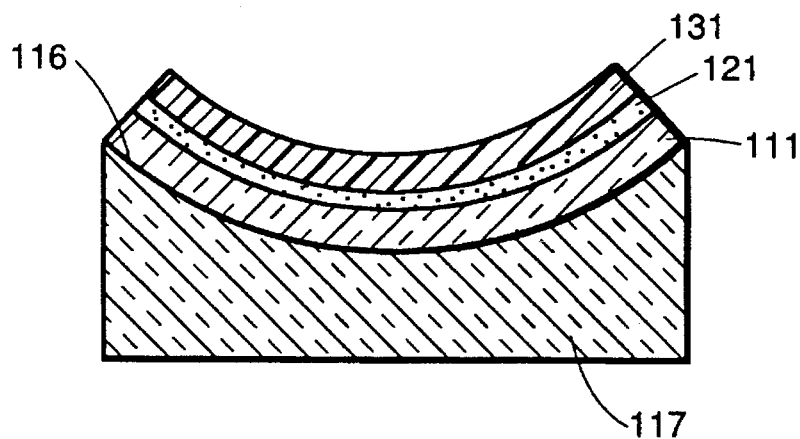
FIGS. 7, 8, 9 and 10 schematically illustrate a further process in accordance with the invention for transferring a photopolymer hologram from a concave curved exposure surface to a convex curved surface of a final substrate.

Referring now to FIG. 7, the invention also contemplates transferring a photopolymer layer 121 from a concave exposure surface 116 to a convex application surface 126, where the concave exposure surface has been matched to the convex application surface, as described further herein. In particular, a PVA release layer 111, a photopolymer layer 121, and a PVA protective layer 131 are formed on a concave exposure surface 116 of a transparent glass exposure substrate 117, shown by way of illustrative example as a plano concave lens, and a hologram is formed in the photopolymer layer 121, for example in accordance with conventional holographic recording techniques. Such techniques would typically include the steps of exposure to hologram forming illumination, exposure to UV light, and baking. It should be noted that since the PVA layer 111 comprises a release layer, the step of baking should be performed carefully to avoid loosening or delamination of the PVA layer 111 from the exposure substrate and to avoid delamination of the photopolymer layer from the photopolymer layer 121. For example, baking at 120° C. for 2 hours does not cause delamination of the release layer or the photopolymer layer. For hologram exposure purposes, the exposure substrate 117 conventionally includes an anti-reflection coating (not shown) on the substrate surface that is opposite the convex exposure surface 116.

Figure 8:
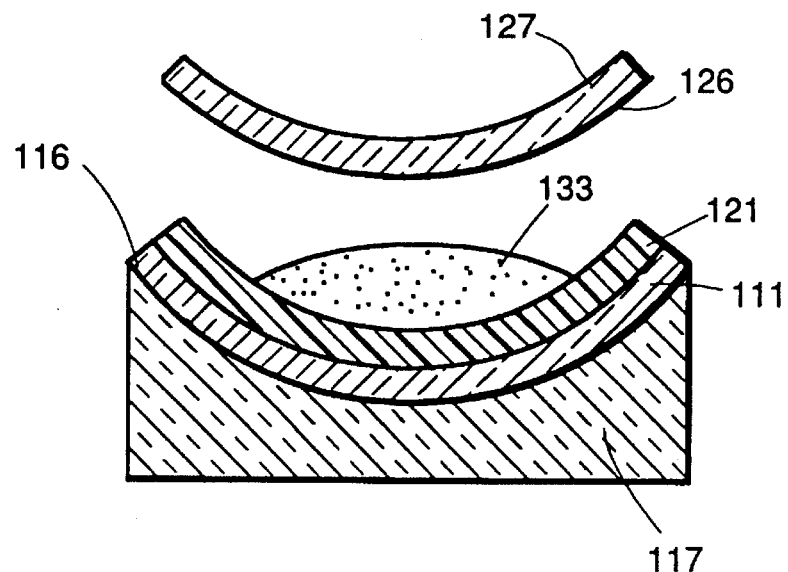
Figure 9:
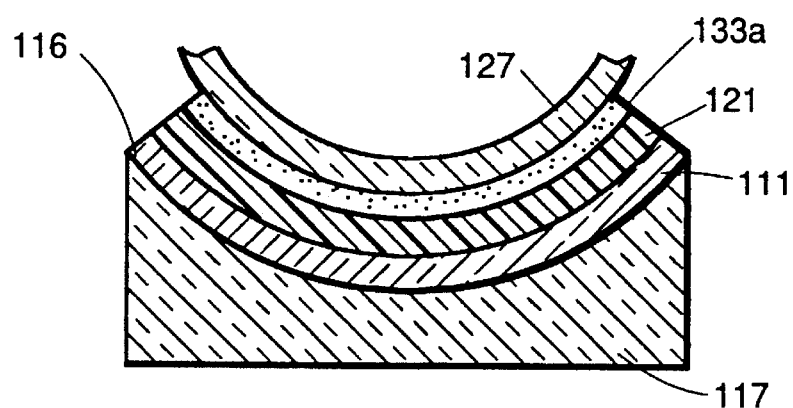
Figure 10:
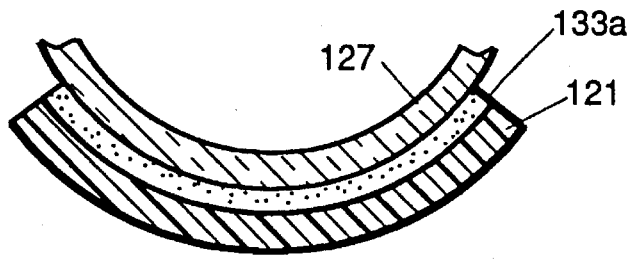

Referring now to FIG. 8, after a hologram is recorded in the photopolymer layer 121, any index matching fluid remaining on the PVA layer 131 is removed, and the PVA layer 131 is peeled from the photopolymer layer 121. The photopolymer layer 121 is then attached with an optical adhesive to a convex application surface 126 of a final substrate 127, where the concave exposure surface 116 has been matched to the convex application surface 126 such that the exposure surface 116 and the application surface 126 can be spaced apart by a predetermined spacing that provides for a substantially constant surface to surface distance between the exposure surface and the application surface which accommodates the thickness of the PVA layer 111, the thickness of the photopolymer layer 121, and a layer of optical adhesive layer having a thickness that is appropriate for the particular optical adhesive. In particular, the assembly comprised of the concave exposure surface 116, the PVA release layer 111 and the photopolymer layer 121 is oriented with the concave photopolymer layer 121 facing upward, and an optical adhesive is poured onto the photopolymer layer to form an adhesive puddle 133. Appropriate spacers (not shown) are installed in a conventional manner for setting the final spacing between exposure surface and the application surface to the predetermined spacing, and the final substrate 127 is then pressed toward the photopolymer layer 121, with the application surface 126 closest to the photopolymer layer 121. As the photopolymer layer 121 is pressed toward the application surface, the optical adhesive will spread between the photopolymer layer 121 and the application surface 126 to form an optical adhesive layer 133a between the photopolymer layer 121 and the application surface, as schematically depicted in FIG. 9. The optical adhesive layer 133a is cured as appropriate for the particular adhesive utilized, and the exposure substrate 117 and the PVA release layer 111 are removed to produce the final hologram assembly comprised of the photopolymer layer 121, the optical adhesive layer 133a, and the final substrate 127, as shown in FIG. 10. For example, the exposure substrate 117 can be gently removed from the PVA layer 111, and the PVA layer 111 can then be removed from the photopolymer layer 121 by peeling, to the extent that the PVA layer 111 remains attached to the photopolymer layer 121. Alternatively, the assembly comprised of the exposure substrate and the PVA layer is gently removed from the photopolymer layer 121, to the extent that the PVA layer remains attached to the exposure surface when the exposure substrate is removed from the assembly shown in FIG. 9. If the PVA layer does not peel as a unitary layer from the photopolymer layer, the PVA fragments on the photopolymer layer can be dissolved with water for removal.

Further in accordance with the invention, in the foregoing implementation the protective layer 131 can be retained so as to protect the photopolymer layer from the optical adhesive layer 133a, in which case the protective PVA layer 131 will be different from the PVA layer 111 and preferably has greater adhesion than the PVA layer 111. Also, the concave exposure surface would be matched to the convex application exposure surface such that the exposure surface 116 and the application surface can be spaced apart by a predetermined spacing that provides for a substantially constant surface to surface distance between the exposure surface and the application surface which accommodates the thickness of the PVA layer 111, the thickness of the photopolymer layer 121, the thickness of the PVA layer 131, and a layer of optical adhesive layer having a thickness that is appropriate for the particular optical adhesive.

The foregoing has been a disclosure of novel techniques for transferring a photopolymer hologram from one curved substrate to another curved substrate that advantageously avoids distortion of the optical properties of the photopolymer hologram.

Although the foregoing has been a description and illustration of specific embodiments of the invention, various modifications and changes thereto can be made by persons skilled in the art without departing from the scope and spirit of the invention as defined by the following claims.

What is claimed is:

1. A method for transferring a photopolymer hologram (21, 121) from a curved exposure surface (16, 116) of an exposure substrate (17, 117) to a curved application surface (27, 127) of a final substrate (27, 127), comprising the steps of:

forming a release layer (11, 111) on the curved exposure surface including applying a polyvinyl alcohol solution to the curved exposure surface;

forming a photopolymer layer (21, 121) on the release layer;

forming a protective layer (31,131) on the photopolymer layer;

recording a hologram in the photopolymer layer;

removing the protective layer;

attaching the assembly comprised of the exposure substrate, the release layer, and the photopolymer layer to the curved application surface of the final substrate with an optical adhesive layer (33a, 133a) located between the photopolymer layer and the curved application surface, wherein the curved exposure surface of the exposure substrate is substantially matched to the curved application surface such that the exposure surface and the application surface are uniformly spaced with a predetermined spacing that accommodates the thickness of the release layer, the thickness of the protective layer, and the thickness of the optical adhesive layer; and removing the release layer and the exposure substrate from the photopolymer layer.

2. The method of claim 1 wherein the step of forming a photopolymer layer includes the step of applying a photopolymer solution to the release coating.

3. A method for transferring a photopolymer hologram (21, 121) from a curved exposure surface (16, 116) of an exposure substrate (17, 117) to a curved application surface (26, 126) of a final substrate (27, 127), comprising the steps of:

forming a release layer (11, 111) on the curved exposure surface including applying a polyvinyl alcohol solution to the curved exposure surface;

forming a photopolymer layer (21, 121) on the release layer;

forming a protective layer (31, 131) on the photopolymer layer;

recording a hologram in the photopolymer layer;

attaching the protective layer to the curved application surface of the final substrate with optical adhesive layer (33a, 133a) located between the protective layer and the curved application surface, wherein the curved exposure surface of the exposure substrate is substantially matched to the curved application surface such that the exposure surface and the application surface are uniformly spaced with a predetermined spacing that accommodates the thickness of the release layer, the thickness of the protective layer, and the thickness of the optical adhesive layer; and removing the release layer and the exposure substrate from the photopolymer layer.

4. The method of claim 3 wherein the step of forming a photopolymer layer includes the step of applying a photopolymer solution to the release coating.

5. A method for transferring a photopolymer hologram (21, 121) from a curved exposure surface (16, 116) of an exposure substrate (17, 117) to a curved application surface (26, 126) of a final substrate (27, 127), comprising the steps of:

forming a release layer (11, 111) on the curved exposure surface;

forming a photopolymer layer (21, 121) on the release layer;

forming a protective layer (31, 131) on the photopolymer layer including applying a polyvinyl alcohol solution to the photopolymer layer;

recording a hologram in the photopolymer layer;

removing the protective layer;

attaching the assembly comprisied of the exposure substrate, the release layer, and the photopolymer layer to the curved application surface of the final substrate with an optical adhesive layer (33a, 133a) located between the photopolymer layer and the curved application surface, wherein the curved exposure surface of the exposure substrate is substantially matched to the curved application surface such that the exposure surface and the application surface are uniformly spaced with a predetermined spacing that accommodates the thickness of the release layer, the thickness of the protective layer, and the thickness of the optical adhesive layer; and removing the release layer and the exposure substrate from the photopolymer layer.

6. The method of claim 5 wherein the step of forming a photopolymer layer includes the step of applying a photopolymer solution to the release coating.

7. A method for transferring a photopolymer hologram (21, 121) from a curved exposure surface (16, 116) of an exposure substrate (17, 117) to a curved application surface (26, 126) of a final substrate (27, 127), comprising the steps of:

forming a release layer (11, 111) on the curved exposure surface;

forming a photopolymer layer (21, 121) on the release layer;

forming a protective layer (31, 131) on the photopolymer layer including applying a polyvinyl alcohol solution to the curved exposure surface;

recording a hologram in the photopolymer layer;

attaching the protective layer to the curved application surface of the final substrate with optical adhesive layer (33a, 133a) located between the protective layer and the curved application surface, wherein the curved exposure surface of the exposure substrate is substantially matched to the curved application surface such that the exposure surface and the application surface are uniformly spaced with a predetermined spacing that accommodates the thickness of the release layer, the thickness of the protective layer, the thickness of the protective layer, and the thickness of the optical adhesive layer; and removing the release layer and the exposure substrate form the photopolymer layer.

8. The method of claim 7 wherein the step of forming a photopolymer layer includes the step of applying a polyvinyl alcohol solution to the photopolymer layer.

* * * * *